(12) United States Patent
Inomata

(10) Patent No.: US 7,324,305 B2
(45) Date of Patent: Jan. 29, 2008

(54) MAGNETIC RECORDING MEDIUM INCLUDING A MAGNETIC LAYER WITH FIRST MAGNETIC PARTICLES AND A PROTECTIVE LAYER WITH SECOND MAGNETIC PARTICLES

(75) Inventor: Akihiro Inomata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 10/979,709

(22) Filed: Nov. 2, 2004

(65) Prior Publication Data

US 2005/0254168 A1    Nov. 17, 2005

(30) Foreign Application Priority Data

May 14, 2004   (JP)   ............................. 2004-144418

(51) Int. Cl.
*G11B 5/66* (2006.01)
*G11B 5/714* (2006.01)

(52) U.S. Cl. ...................... 360/135; 428/829
(58) Field of Classification Search ................ 360/135; 428/827, 829, 830
See application file for complete search history.

(56) References Cited

U.S. PATENT DOCUMENTS

| | | | | |
|---|---|---|---|---|
| 5,662,984 A | * | 9/1997 | Honda et al. ............... | 428/141 |
| 5,972,438 A | * | 10/1999 | Suzuki et al. ............... | 427/548 |
| 6,162,532 A | * | 12/2000 | Black et al. ................ | 428/323 |
| 6,773,745 B2 | * | 8/2004 | Arisaka et al. ............. | 427/130 |
| 6,805,904 B2 | * | 10/2004 | Anders et al. .............. | 427/203 |
| 6,881,495 B2 | * | 4/2005 | Kikitsu et al. .............. | 428/827 |
| 2006/0153976 A1 | * | 7/2006 | Ito et al. ...................... | 427/127 |
| 2006/0222902 A1 | * | 10/2006 | Mukai ........................ | 428/827 |
| 2006/0246323 A1 | * | 11/2006 | Liu et al. .................... | 428/829 |
| 2006/0286413 A1 | * | 12/2006 | Liu et al. .................... | 428/829 |

FOREIGN PATENT DOCUMENTS

| | | |
|---|---|---|
| JP | 8-151207 | 6/1996 |
| JP | 9-142819 | 6/1997 |
| JP | 9-259423 | 10/1997 |
| JP | 10-049855 | 2/1998 |
| JP | 2001-067644 | 3/2001 |
| JP | 2003-095627 | 4/2003 |

* cited by examiner

*Primary Examiner*—Jefferson Evans
(74) *Attorney, Agent, or Firm*—Greer, Burns & Crain, Ltd.

(57) ABSTRACT

The present invention enables a substantial decrease of the magnetic spacing while maintaining the flying height of the transducer and the structure of the protective layers for a magnetic recording device. A magnetic layer containing first magnetic particles is formed on a substrate of a magnetic recording medium, and a magnetic recording medium protective layer containing second magnetic particles is formed on the magnetic layer. If the magnetic recording transducer has a protective layer, that protective layer may contain magnetic particles.

16 Claims, 11 Drawing Sheets

MAGNETIC RECORDING MEDIUM INCLUDING A MAGNETIC LAYER WITH FIRST MAGNETIC PARTICLES AND A PROTECTIVE LAYER WITH SECOND MAGNETIC PARTICLES

CROSS-REFERENCE TO RELATED APPLICATIONS

This application is based upon and claims the benefit of priority from the prior Japanese Patent Application No. 2004-144418, filed on May 14, 2004, the entire contents of which are incorporated herein by reference.

BACKGROUND OF THE INVENTION

1. Field of the Invention

The present invention relates to a magnetic recording medium or the like in a magnetic recording device.

2. Description of the Related Art

An increase in recording density is demanded for a magnetic recording device such as a hard disk device. One means for increasing recording density is decreasing magnetic spacing.

Magnetic spacing is defined by the distance from the surface of the magnetic recording transducer (hereafter also called transducer) to the top face of the magnetic layer of the magnetic recording medium, or to the half of the film thickness of the magnetic layer, and is a total of the thickness of the magnetic head protective layer (also called the "head protective layer" in this specification), the thickness of the magnetic head lubricant layer (also called the "head lubricant layer" in this specification), the flying height (also called "floating height") of the transducer, the thickness of the magnetic recording medium lubricant layer (also called the "medium lubricant layer" in this specification), and the thickness of the magnetic recording medium protective layer (also called the "medium protective layer" in this specification) (in the latter case, the half of the film thickness of the magnetic layer is further added). The head lubricant layer may be omitted.

If the magnetic spacing is decreased by decreasing the distance between the transducer and the magnetic recording medium, the signal intensity and reproduction resolution increases at reproduction, and the recording magnetic field intensity and recording resolution increases at recording, which is an advantage (e.g. see Japanese Unexamined Patent Application Publication No. H9-219077 (paragraph No. 0003)).

Improvements (that is a decrease) of the magnetic spacing is approaching the limit. The major means for improving the magnetic spacing of a hard disk device has, for example, been decreasing the film thickness of the medium protective layer and decreasing the flying height of the transducer, but the flying height of the transducer is already about 10 nm, and can no longer be decreased if the unevenness on the surface of the magnetic recording medium is considered, because a further decrease of the flying height may cause contact of the transducer and the surface of the magnetic recording medium, which would result in damage to the transducer and the magnetic recording medium.

The medium protective layer has already reached about a 3 nm thickness, and it is difficult to decrease this further since the role of the medium protective layer is to prevent the corrosion of the magnetic recording medium while maintaining sufficient hardness for protecting the magnetic recording medium and the transducer in the event of both contacting. Therefore a decrease in the flying height of the transducer and a decrease in the film thickness of the medium protective layer are approaching the limit. This situation is the same for the head protective layer if the head protective layer is formed on the transducer.

SUMMARY OF THE INVENTION

It is an object of the present invention to solve the above problems and to provide a new technology for substantially decreasing the magnetic spacing while maintaining the flying height of the transducer and the structure of the protective layers for a magnetic recording device, such as the medium protective layer and the head protective layer. The other objects and advantages of the present invention will be clarified by the description herein below.

According to one aspect of the present invention, a magnetic recording medium comprising a magnetic layer containing first magnetic particles formed on a substrate, and a magnetic recording medium protective layer containing second magnetic particles formed on the magnetic layer, is provided.

It is preferable that an average projection area X per second magnetic particle and an average projection area Y per first magnetic particle are $X \leq Y$, or $X \leq Y/10$ when viewed in a direction perpendicular to the magnetic layer surface, that the length in a cylindrical axis direction when the second magnetic particle is regarded as a cylinder is in a 0.3 to 500 nm range, or the circle-equivalent diameter of the end face is in a 0.3 to 500 nm range, that the diameter of the second magnetic particle when converted into a sphere is in a 0.3 to 500 nm range, that the ratio of the mutually contacting magnetic particles to all magnetic particles is 50% or less in the case of the second magnetic particles, that the magnetic recording medium protective layer contains second magnetic particles existing in cage structures, that the cage structure has a six-membered-ring network structure of carbon, that the cage structure is a structure selected from the group consisting of a spherical structure, a tube structure of which the edges may not be sealed, and a conical structure, that the second magnetic particles comprise iron, cobalt or nickel, that the second magnetic particle has soft magnetism, that the coercive force of the second magnetic particles is equal to or less than the coercive force of the first magnetic particles, that the saturation magnetization of the second magnetic particles is equal to or more than the saturation magnetization of the first magnetic particles, that the magnetic recording medium protective layer contains diamond-like carbon, that the second magnetic particles are contained in the magnetic recording medium protective layer in the range of 22 to 99% by weight, and that the thickness of the magnetic recording medium protective layer is in a 0.3 to 500 nm range.

According to another aspect of the present invention, a magnetic head comprising a magnetic recording transducer for recording and/or reproducing data to/from a magnetic recording medium comprising a magnetic layer containing magnetic particles, for example, wherein the magnetic recording transducer comprises a magnetic head protective layer containing magnetic particles, is provided.

The preferable aspects of this magnetic head are the same as those of the above-described magnetic recording medium. For example, it is preferable that an average projection area X' per magnetic particle in the magnetic head protective layer and an average projection area Y' per magnetic particle in the magnetic layer are $X' \leq Y'$ or $X' \leq Y'/10$ when viewed in a direction perpendicular to the magnetic layer surface.

By the present invention, the magnetic spacing can be substantially decreased while maintaining the flying height of the transducer and the structure of the protective layers for the magnetic recording device.

According to still another aspect of the present invention, a magnetic recording device that uses the above-described magnetic head and magnetic recording medium is provided.

By the present invention, the magnetic spacing can be substantially decreased while maintaining the flying height of the transducer and the structure of the protective layers for the magnetic recording device.

DESCRIPTION OF THE PREFERRED EMBODIMENTS

Figure 1:
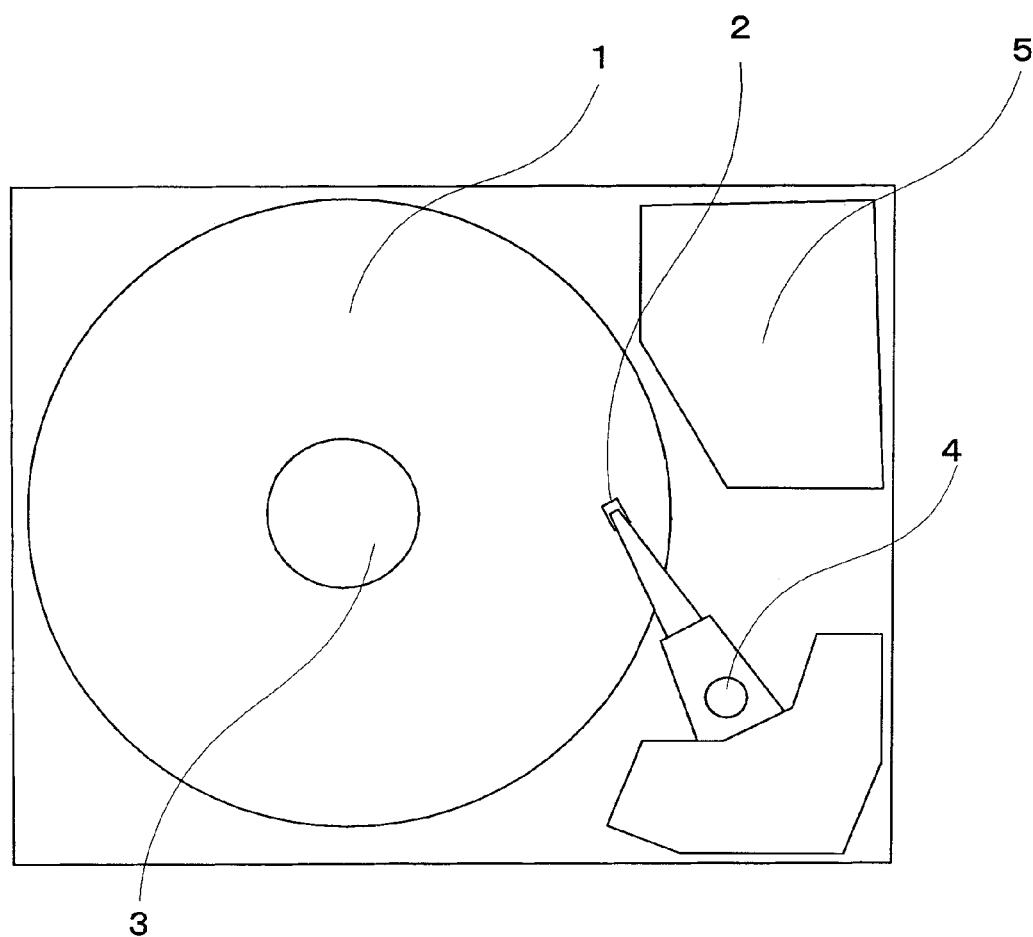
FIG. 1 is a model plan view depicting the internal structure of a hard disk device.

Embodiments of the present invention will now be described with reference to the drawings, examples, etc. These drawings, examples, etc. plus descriptions are merely for demonstrating the present invention and do not limit the scope of the present invention. Needless to say, other embodiments are embraced by the scope of the present invention as long as they match the essential character of this invention. The same elements in the drawings are denoted with the same reference numerals and signs. The "(magnetic recording) transducer", "magnetic recording medium" and "magnetic recording device" according to the present invention can be used for only recording (write) of the magnetic information or for only reproduction (read) of the magnetic information and for both the recording and reproduction of magnetic information.

The present invention will now be described primarily using a hard disk device as an example, but the "magnetic recording medium" according to the present invention also includes a longitudinal magnetic recording medium, an SFM (Synthetic Ferrimagnetic Medium or Antiferromagnetically Coupled Media), a perpendicular magnetic recording medium and a patterned medium, which are used for a hard disk device. Not only the media for a hard disk device, but also any magnetic recording medium where magnetic flux is generated from recorded bits is included. These are, for example, magnetic tapes, magneto-optical recording media, magnetic cards and magnetic memories. The "transducer" according to the present invention is a magnetic pole, coil or electric wire that generates a magnetic flux (magnetic field), or a sensor for detecting the magnetic flux (magnetic field), such as an electromagnetic conversion coil, a Hall element, a superconducting quantum interference device and a magnetoresistive effect element, particularly a TMR element and GMR element. A method to bring the transducer close to the magnetic recording medium may be one operating with the loading-unloading mechanism, one operating with the contact-start-stop mechanism, one with which information is recorded and reproduced by the complete floating method, one with which information is recorded and reproduced by the gas-liquid mixing system, or one with which information is recorded and reproduced by the contact method. Furthermore, the "magnetic recording device" according to the present invention includes all magnetic recording devices using these magnetic recording media and magnetic heads. Particularly devices for detecting a magnetic flux (magnetic field) from a magnetic recording medium by a transducer, or devices for irradiating a magnetic field from a transducer to a magnetic recording medium are included.

Figure 2:
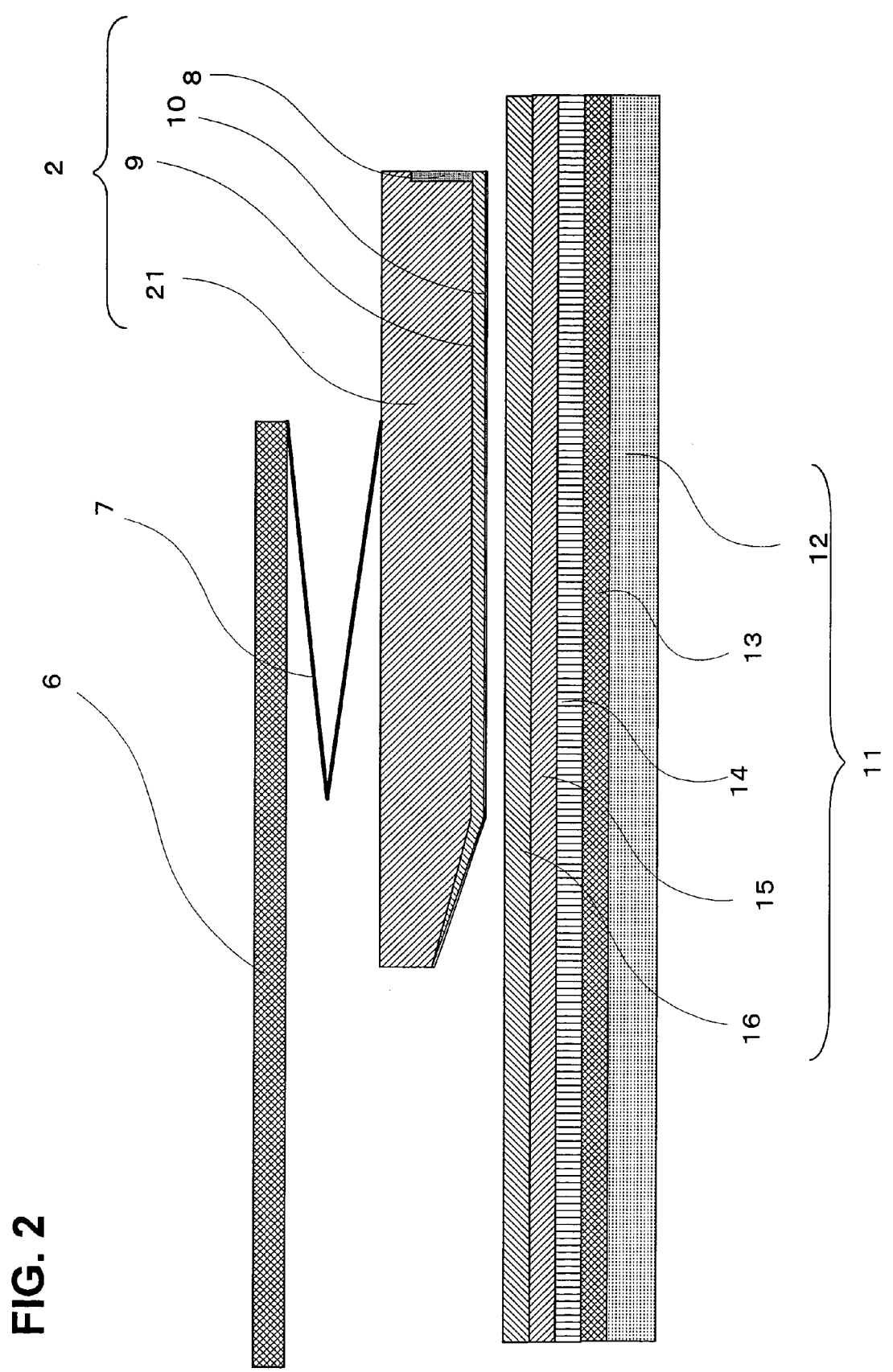
FIG. 2 is a model side cross-sectional view depicting the relationship between a transducer and a magnetic recording medium of a hard disk device.

FIG. 1 is a model plan view depicting the internal structure of a hard disk device, and FIG. 2 is a model side cross-sectional view (the cross-sectional view cut in a direction perpendicular to the magnetic layer surface of the magnetic recording medium) depicting the relationship between a transducer and a magnetic recording medium.

This hard disk device comprises, as main components, a magnetic recording medium 1, a magnetic head 2 that has a transducer, a rotation control mechanism (e.g. spindle motor) 3 for the magnetic recording medium 1, positioning mechanism 4 for the transducer, and processing circuit (e.g. read/write amplifier) 5 for recording/reproducing signals, as shown in FIG. 1.

As FIG. 2 shows, the magnetic head 2 is connected with the positioning mechanism 4 of the transducer by a suspension 6 and gimbals 7 for flexibly supporting the magnetic head 2, and a transducer 8 is installed at the tip of the magnetic head 2. On the floating face of a head slider section 21 of the magnetic head 2, a head protective layer 9 and a head lubricant layer 10 are formed. In this way, a magnetic head is often comprised of a transducer, head slider section, head protective layer and head lubricant layer, but as mentioned above, the head lubricant layer may be omitted, and also the head slider section may not actually exist in some cases.

A magnetic recording medium 11 is comprised of a substrate 12, Cr underlayer 13, magnetic layer 14, medium protective layer 15, medium lubricant layer 16, etc. from the bottom to top in FIG. 2. In the case of a hard disk device, the thickness of the medium lubricant layer is about 1 nm, the medium protective layer is about 5 nm, the magnetic layer is about 15 nm, and the Cr underlayer is about 10 nm, in general.

In a magnetic recording medium, other layers, such as a seed layer, may be formed, but they are omitted in FIG. 2. Examples of those having other layers are the longitudinal magnetic recording medium shown in FIG. 13 and the perpendicular magnetic recording medium shown in FIG. 14.

Figure 13:
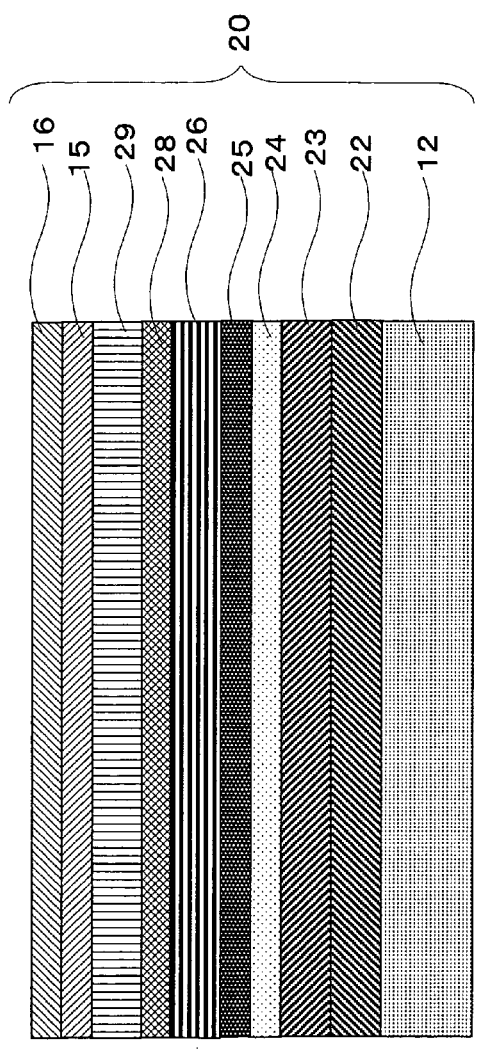
FIG. 13 is a model side cross-sectional view depicting a longitudinal magnetic recording medium.

FIG. 13 is a model cross-sectional view depicting the longitudinal magnetic recording medium. In FIG. 13, the longitudinal magnetic recording medium 20 is comprised of a first seed layer 22, second seed layer 23, underlayer 24, non-magnetic intermediate layer 25, first magnetic layer 26, non-magnetic coupling layer 28, second magnetic layer 29, medium protective layer 15 and medium lubricant layer 16, which are sequentially formed on a substrate 12. The longitudinal magnetic recording medium 20 has an exchange coupling structure where the first magnetic layer 26 and the second magnetic layer 29 are antiferromagnetically exchange-coupled via the non-magnetic coupling layer 28. The magnetization directions of the first magnetic layer 26 and the second magnetic layer 29 are in-plane oriented, and are antiparallel in a status in which an external magnetic field is not applied.

Figure 14:
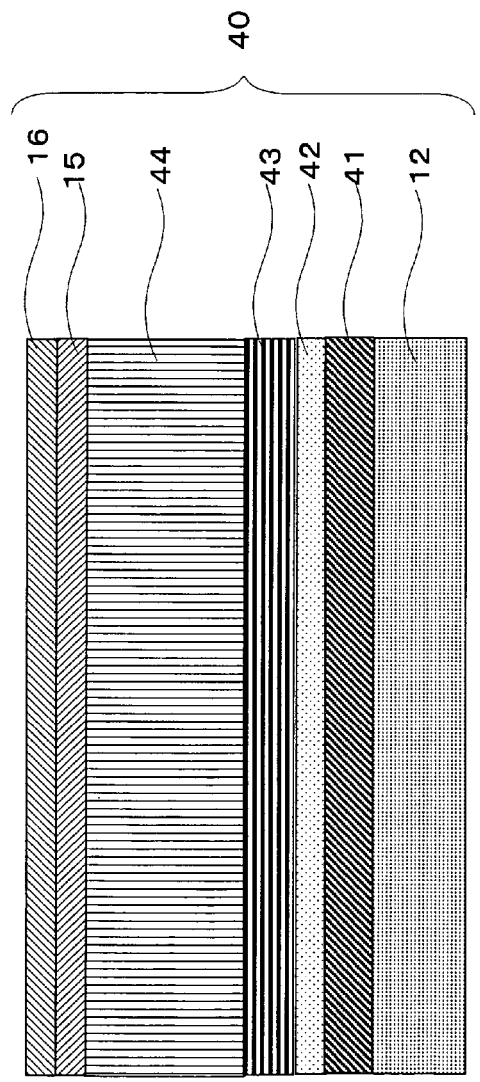
FIG. 14 is a model side cross-sectional view depicting a perpendicular magnetic recording medium.

In FIG. 14, the perpendicular magnetic recording medium 40 comprises a soft magnetic backing layer 41, seed layer 42, non-magnetic intermediate layer 43, vertically magnetized film 44, medium protective layer 15 and medium lubricant layer 16, which are sequentially layered on a substrate 12.

According to the present invention, a magnetic recording medium comprises a magnetic layer for recording various information and a magnetic protective layer for protecting the magnetic layer from physical and chemical damage, which are formed on the substance, wherein magnetic particles are contained not only in the magnetic layer but also in the medium protective layer. By this, the magnetic spacing can be substantially decreased.

Figure 3:
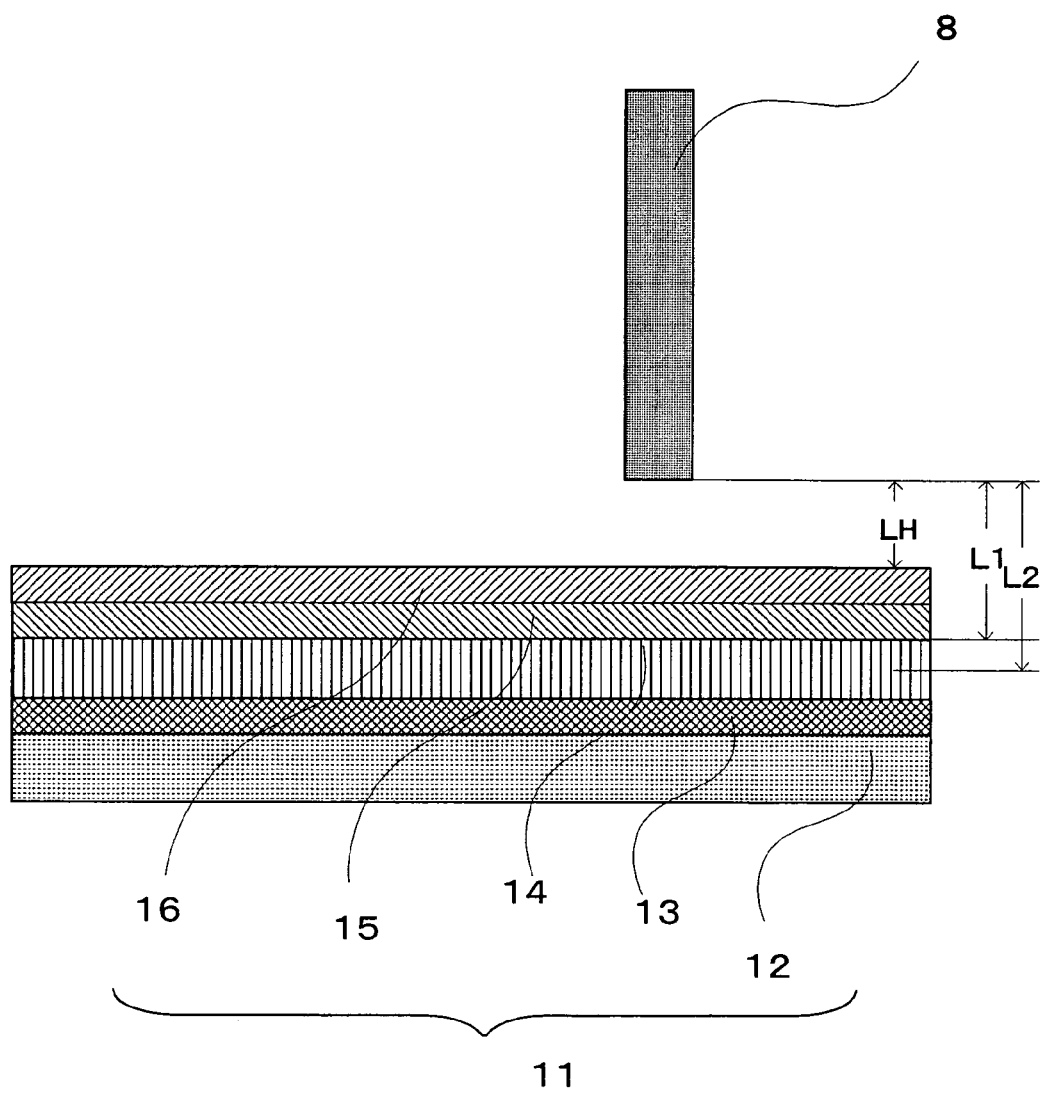
FIG. 3 is a model side cross-sectional view illustrating a transducer portion on a magnetic head and a magnetic recording medium not containing second magnetic particles.
Figure 4:
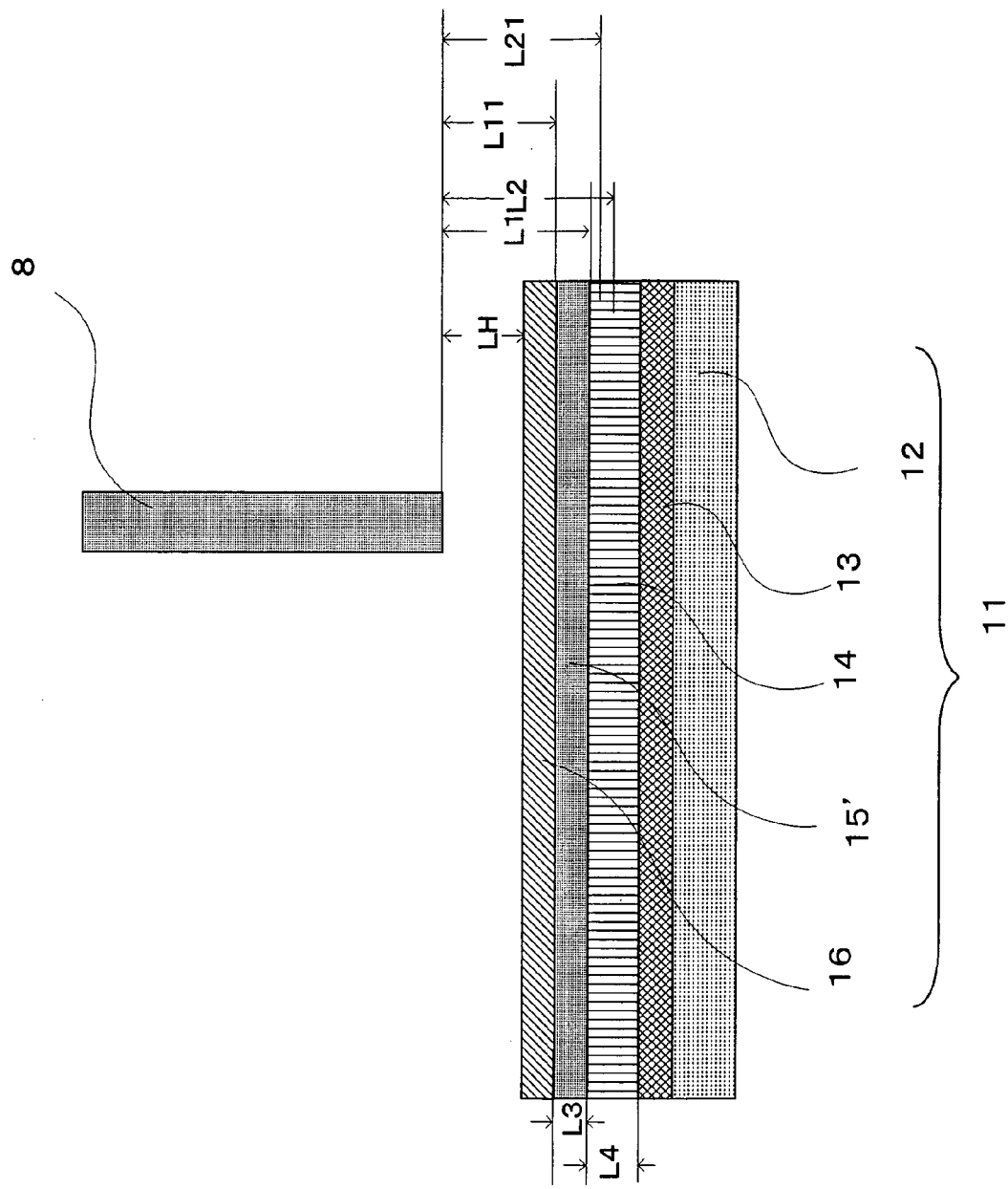
FIG. 4 is a model side cross-sectional view illustrating a transducer portion on a magnetic head and a magnetic recording medium containing the second magnetic particles.

This status will be described with reference to FIG. 3 and FIG. 4. FIG. 3 is a model side cross-sectional view depicting a transducer portion on the magnetic head and magnetic recording medium not containing second magnetic particles as an example. FIG. 4 is a model side cross-sectional view depicting a transducer portion on the magnetic head and magnetic recording medium containing second magnetic particles as an example. The medium protective layer 15 in FIG. 3 does not contain the second magnetic particles, but the medium protective layer 15' in FIG. 4 does contain the second magnetic particles. The thickness of each layer and the flying height of the transducer are the same in FIG. 3 and FIG. 4.

In FIG. 3 and FIG. 4, L1 is a magnetic spacing based on the above-described first definition, and L2 is a magnetic spacing based on the second definition, which are the same for both FIG. 3 and FIG. 4. LH, which is the flying height of the transducer, is also the same for both FIG. 3 and FIG. 4. However, the medium protective layer 15' in FIG. 4 contains the second magnetic particles, so it can be considered that the magnetic spacing in FIG. 4 is substantially smaller than the magnetic spacing in FIG. 3. This means that the medium protective layer 15' in FIG. 4 can have the function of a magnetic layer. In this sense, the magnetic spacing in FIG. 4 can be regarded as L11 according to the first definition, and as L21 according to the second definition. In other words, if the thickness of the medium protective layer is L3 and the thickness of the magnetic layer is L4, it can be regarded that the magnetic spacing decreases for the amount of L3 according to the first definition, and the magnetic spacing decreases for the amount of (L3+L4/2)−(L3+L4)/2=L3/2 according to the second definition. This means that the second magnetic particles according to the present invention accurately reproduces the magnetic flux of the magnetic recording medium on the surface of the medium protective layer during reproducing data, and magnetization is inverted easily following up the magnetic field of the transducer to assist in recording during the recording.

This effect can be taken as increasing the signal intensity and the reproduction resolution during reproducing data, and increasing the recording magnetic field intensity and the recording resolution during recording, without changing the flying height of the transducer.

For the magnetic particles according to the present invention, any known material can be used, such as iron, cobalt, nickel, an alloy of these metals, a compound of these metals and a mixture thereof. The greater saturation magnetization of the second magnetic particles in the medium protective layer contributes more to the signals. Specifically, it is preferable that the saturation magnetization is equal to or more than the saturation magnetization of the first magnetic particles. On the other hand, this could cause magnetostatic coupling between second magnetic particles, so it is preferable to select an appropriate value, taking into consideration the distance between the second magnetic particles.

For the second magnetic particles, iron, cobalt, nickel, an ally of these metals, a compound of these metals and a mixture thereof can be used, but particularly, iron, cobalt or nickel is preferable in a practical sense, since such a metal can play the role of a catalyst or the like when the later-mentioned structures, particularly nano-sized structures, are fabricated. Furthermore, in order to accurately reflect the magnetic flux from the magnetic layer, it is preferable that the second magnetic particles have soft magnetic properties. In other words, it is preferable that the coercive force is small enough to follow up the high-speed writing by the transducer. For this purpose, materials used for the recording head magnetic pole material of the hard disk device, an NiFe alloy and a CoFe alloy, for example, can be used for the second magnetic particles. In this case, the second magnetic particles function as if they were a part of the transducer. On the other hand, the second magnetic particles may have an appropriate coercive force (about several hundred Oe) for controlling noise due to thermal agitation. Specifically it is preferable to select a coercive force that is equal to or less than the coercive force of the first magnetic particles. To control the coercive force, it is effective to add Pt to the second magnetic particles to be CoPt or FePt.

For the medium protective layer according to the present invention, it is possible to freely select a material which is used to form a known protective layer, besides the second magnetic particles. Examples are oxides and nitrides of elements in the VIa group; carbides and nitrides of elements in the IVa group; nitrides of elements in the Va group; carbides and nitrides of elements in the IVa group; carbides and nitrides of elements in the IVb group; carbides and nitrides of elements in the IIIb group; and simple elements. More specifically, $TiO_2$, $Cr_2O_3$, CrN, WC, TiC, ZrC, SiC, $Al_2O_3$, BN or the like and a simple element DLC are examples. DLC is a diamond-like carbon, of which the crystal structure includes an $sp^3$ bonding of carbon which is the same as a natural diamond, an $sp^2$ bonding of carbon which is the same as graphite, and in some cases an amorphous structure comprising bonding with hydrogen, and has high hardness, low abrasion and low friction, and has an excellent surface smoothness.

To deposit the films of these materials, a plasma CVD (Chemical Vapor Deposition) method for depositing thin films on a substrate heated to be 100 to 200° C. by causing a chemical reaction such as decomposition and bonding of the raw material gas under a low pressure environment, using plasma energy generated with a high frequency electric power in a vacuum chamber, or a sputtering method, wherein an inert gas such as Ar is ionized under a low pressure environment using an electric field or the like in a vacuum chamber, the ionized ions are accelerated and implanted into the target material, and atoms knocked off by this are deposited on the facing substrate to form a thin film, are primarily used.

For the magnetic particles according to the present invention, it is preferable that the average projection area X per second magnetic particle and the average projection area Y per first magnetic particle is in the relationship of $X \leq Y$, when viewed in a direction perpendicular to the magnetic layer surface. And $X \leq Y/10$ is even more preferable.

Figure 5:
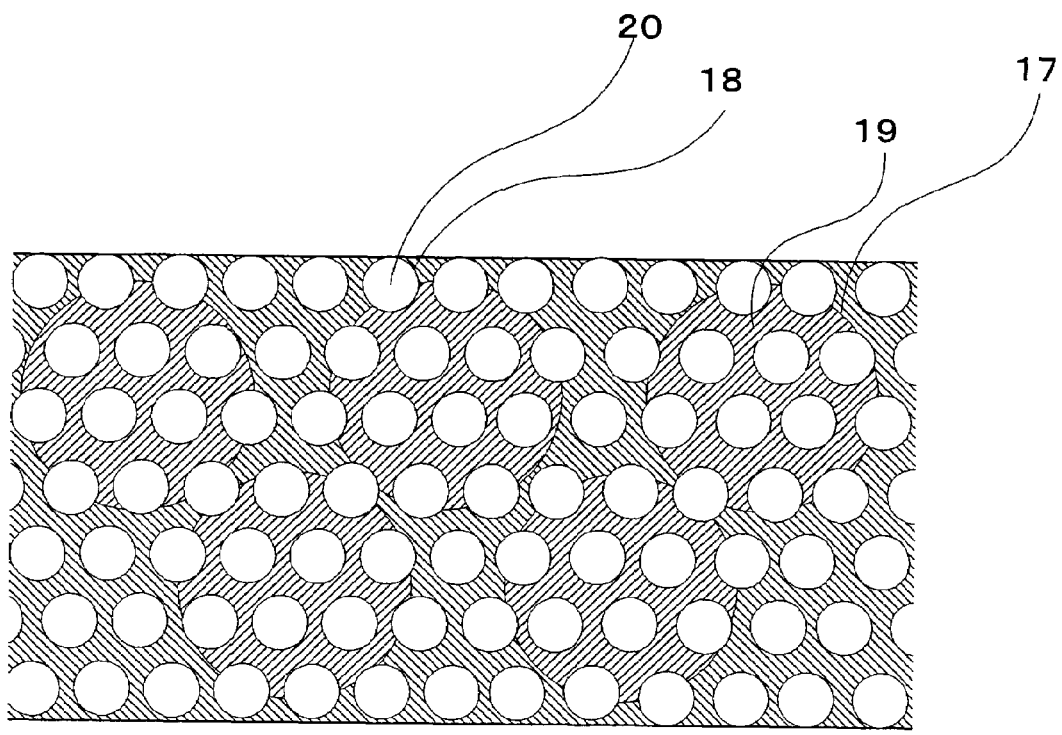
FIG. 5 is a model diagram depicting the interface between a medium protective layer and a magnetic layer, as the magnetic recording medium is viewed in a direction perpendicular to the magnetic layer surface.
Figure 6:
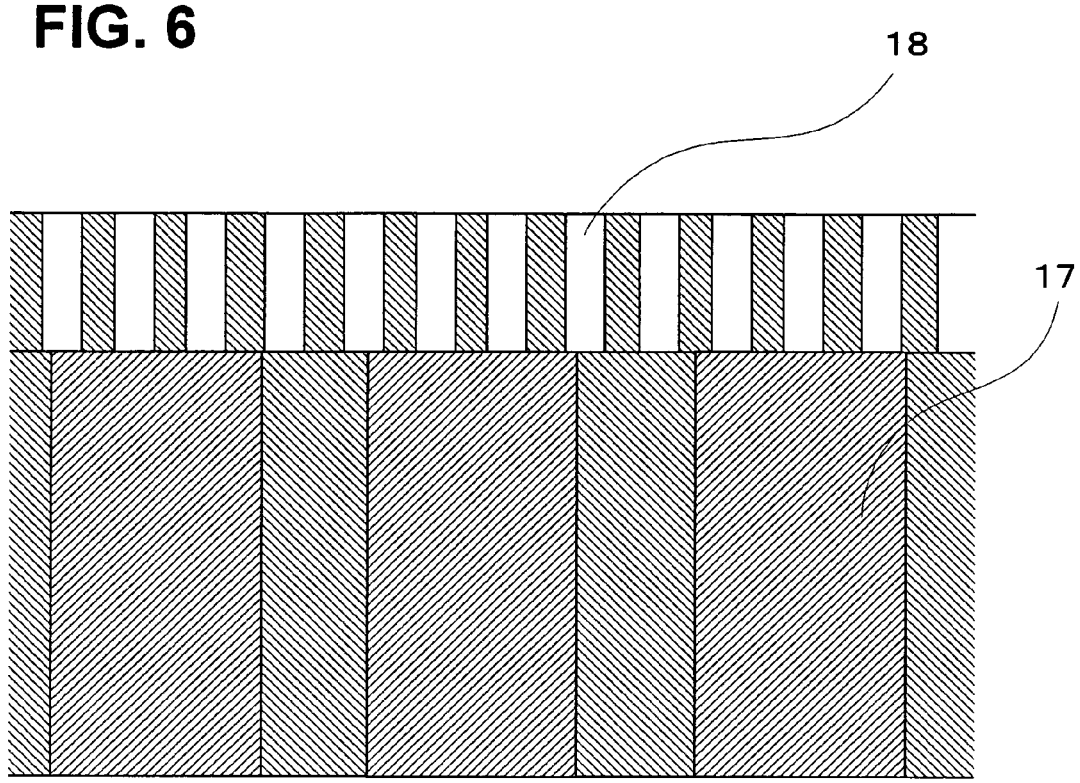
FIG. 6 is a model diagram depicting a magnetic recording medium viewed in a direction in parallel with the magnetic layer surface.

An example of this status is shown in FIG. 5 and FIG. 6. FIG. 5 is a model diagram depicting the interface between a medium protective layer and a magnetic layer when the magnetic recording medium is viewed in a direction perpendicular to the magnetic layer surface, and FIG. 6 is a diagram depicting the interface when the magnetic recording medium is viewed in a direction in parallel with the magnetic layer surface. In FIG. 5, shown are projections of the cylindrical first magnetic particles 17 and the cylindrical second magnetic particles 18. In FIG. 5, the shaded portion 19 shows the projection area of the first magnetic particles 17, and the white portion 20 shows the projection area of the second magnetic particles 18.

The average projection area per magnetic particle can be determined by an arbitrary method. For example, the total projection area and the number of particles of the magnetic particles in a predetermined area are determined from an electron microscope photograph, and the latter is divided by the former. These measurements need not be determined after constructing an actual magnetic recording medium, but may be determined under model conditions. It is sufficient that the above-described projection area and the number of particles are determined only for the interface between the magnetic protective layer and the magnetic layer (if these are determined using models for the medium protective layer and for the magnetic layer, measurement is performed only for the surfaces thereof).

If the three-dimensional configuration of the magnetic particles in the magnetic layer or the medium protective layer can be known, the projection area and the number of particles may be theoretically determined from the shape data on the magnetic particles before they are contained in the magnetic layer and the medium protective layer. For example, as shown in FIG. 5 and FIG. 6, if the magnetic particle is cylindrical and is contained in the magnetic layer or medium protective layer with its major axis perpendicular to the surface of the magnetic layer or the medium protective layer, then the area of the end face of the magnetic particle can be regarded as the projection area.

With this structure, the second magnetic particles are magnetized by the magnetic flux from the magnetic layer thereunder, and if X is sufficiently smaller than Y, the magnetic flux from the magnetic layer thereunder is accurately reflected, and bit patterns almost the same as that on the magnetic layer are formed on the surface of the magnetic recording medium, without causing noise of the magnetic recording medium. Therefore the medium protective layer becomes equivalent to the magnetic layer, and does not interrupt the reproduction of signals. At recording, the medium protective layer is easily magnetized by the magnetic field of the transducer, and does not interrupt recording.

Figure 7:
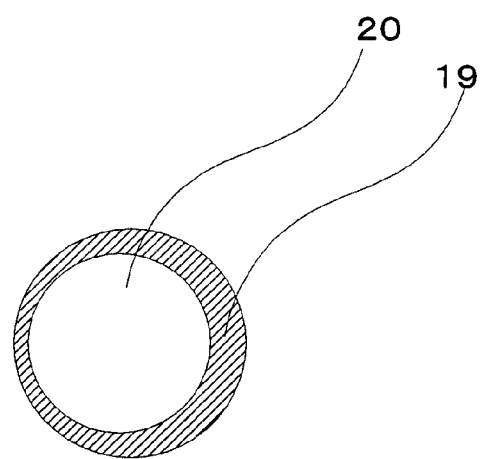
FIG. 7 is a model diagram depicting the interface between a medium protective layer and a magnetic layer, as the magnetic recording medium is viewed in a direction perpendicular to the magnetic layer surface.

Therefore it is generally preferable that X is smaller than Y. In other words, as FIG. 5 and FIG. 6 show, it is preferable that a plurality of second magnetic particles correspond to one first magnetic particle. $X \leq Y/10$ is even more preferable. However, even if X is not very much smaller than Y, the effect of substantially decreasing the magnetic spacing can be expected. For example, as shown in FIG. 7 which is a model diagram depicting the interface between the magnetic protective layer and the magnetic layer, when the magnetic recording medium is viewed in a direction perpendicular to the magnetic layer surface, in the same way as for FIG. 5, an effect similar to the above can be expected if the projection area portion 20 of the second magnetic particle 18 overlaps well with the projection area portion 19 of the first magnetic particle 17. If the second magnetic particle is cylindrical, these particles need not be arranged in perpendicular positions as shown in FIG. 5 and FIG. 6, but may be in horizontal positions or in various other arrangements.

Figure 8:
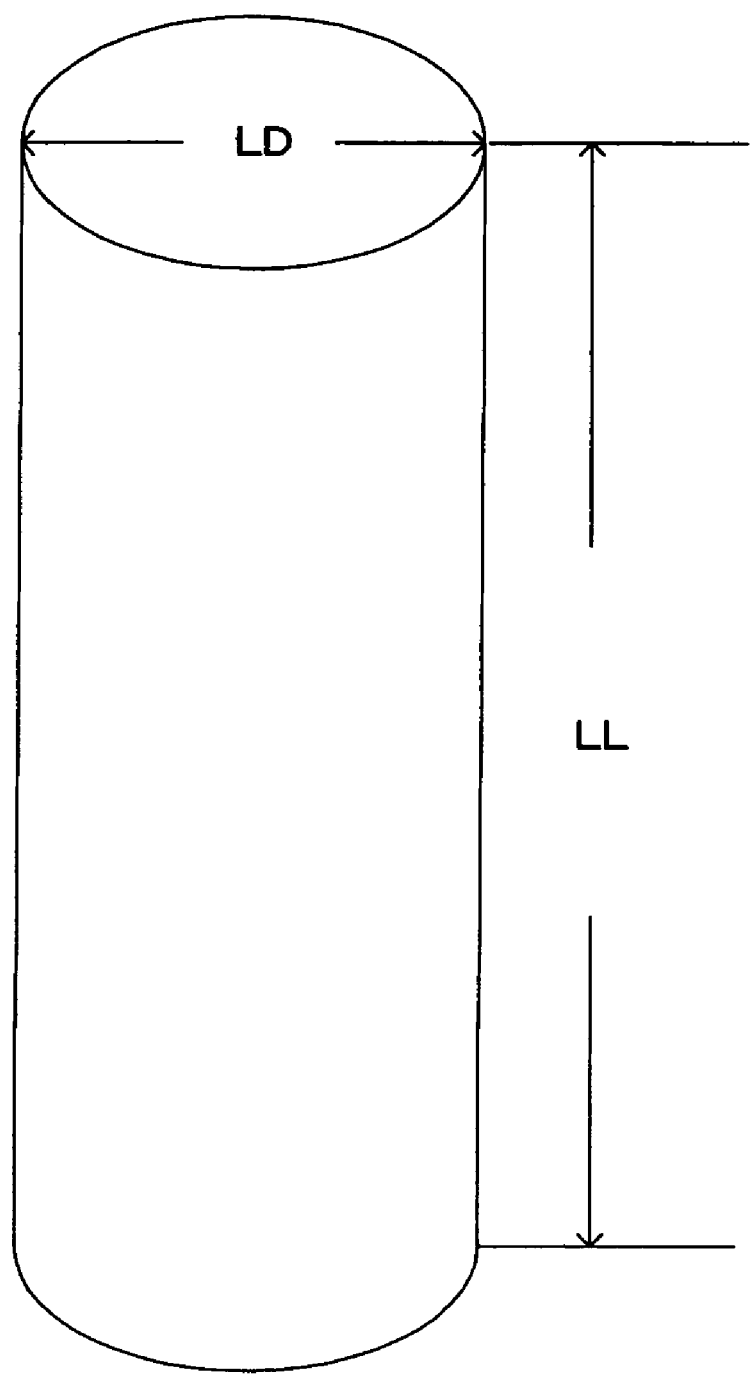
FIG. 8 is a model diagram depicting the length LL of a cylinder in the cylindrical axis direction, and the circle-equivalent diameter LD of the end face.

To achieve the above object, it is necessary that the second magnetic particle is sufficiently smaller than the first magnetic particle. The shape of the second magnetic particle is normally a grain shape or cylindrical shape, and if the second magnetic particle is regarded as cylindrical, the length in the cylindrical axis direction is preferably in a 0.3 to 500 nm range. It is more preferable that the length in the cylindrical axis direction is in a 0.6 to 50 nm range, and a 1 to 2.0 nm range is even more preferable. The circle-equivalent diameter at the end face in this case is preferable in a 0.3 to 500 nm range, and a 0.3 to 50 nm range is more preferable, and a 1 to 20 nm range is even more preferable. If the second magnetic particle is regarded as spherical, the diameter of the particle when converted into a sphere is preferable in a 0.3 to 500 nm range, and a 0.3 to 50 nm range is more preferable, and a 1 to 20 nm range is even more preferable. FIG. 8 shows a model diagram depicting the length LL in the cylindrical axis direction of a cylinder and the circle-equivalent diameter LD of the end face (diameter itself in this case, since the end face is perfectly circular). Whether a particle can be regarded as cylindrical or spherical is freely determined. Needless to say, the particle can be regarded as cylindrical as well when the end face is not a perfect circle but is elliptic, has a polygon shape, or is in a similar shape. These values are determined as average values of the magnetic particles. If the upper limit is exceeded, a complicated magnetic domain tends to be generated in the second magnetic particles, which drops the reproduction resolution and recording resolution.

Furthermore, as for the above object, it is preferable that the second magnetic particles are dispersed with a certain distance from one another, so as to prevent magnetic coupling. The quality of dispersion can be judged by directly observing the dispersion status in the interface at the magnetic layer side of the medium protective layer (if determined using a model of only the medium protective layer or of only the magnetic layer, the surface thereof is observed) using an electron microscope. In this observation, the ratio of the second magnetic particles, which are mutually contacting to all the second magnetic particles, is preferably 50% or less, and 20% or less is more preferable, and 5% or less is even more preferable.

It is also preferable that the medium protective layer contains second magnetic particles existing in cage structures. In this case, though the medium protective layer may also contain second magnetic particles not existing in a cage structure, it is generally preferred that as many second magnetic particles as possible exist in cage structures.

A cage structure refers to a structure in which a second magnetic particle is completely or partially surrounded by a certain structure. More specifically, it is preferable that a second magnetic particle exists in a nano-sized structure selected from the group consisting of the group consisting of a spherical structure, a tube structure of which the edges may not be sealed (hereafter the tube structure may be called CNT), and a conical structure, as they are called a fullerene, carbon nanotube, carbon nanohorn and carbon nanocone. Among fullerene structures, C60 is well known, but those with other carbon numbers, such as C82, also exist.

Figure 9:
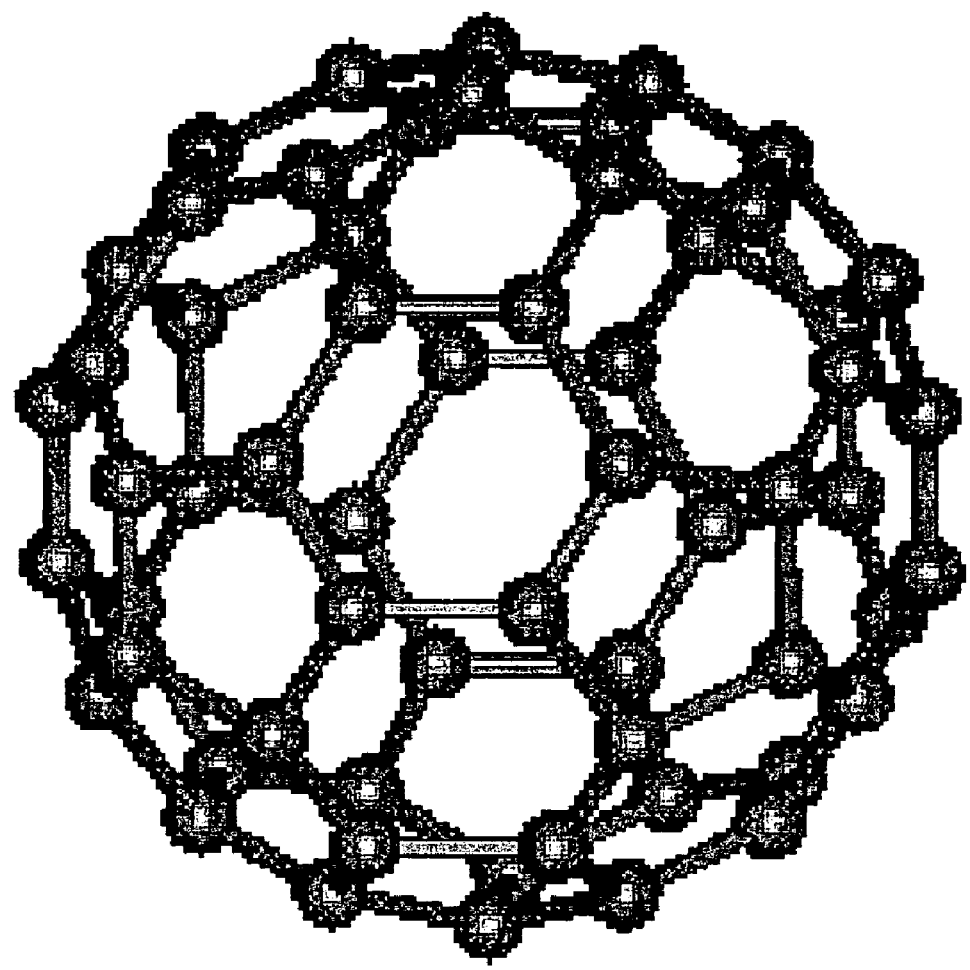
FIG. 9 is a model diagram depicting the structure of fullerene.
Figure 10:
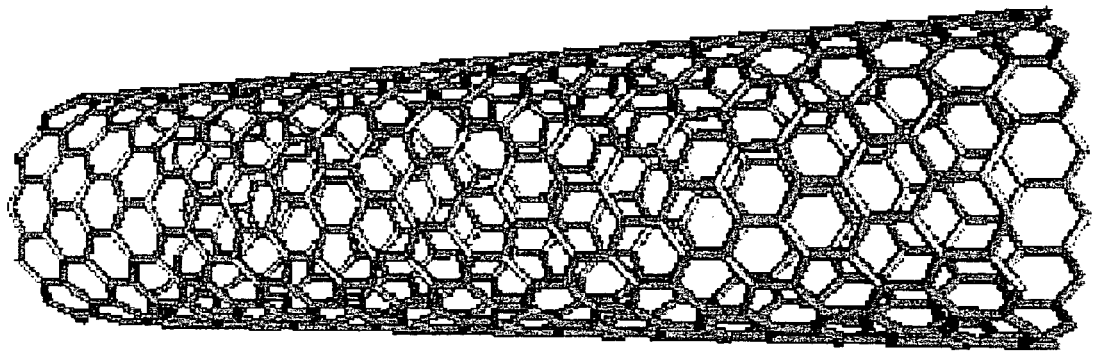
FIG. 10 is a model diagram depicting a CNT of which ends are not sealed.
Figure 11:
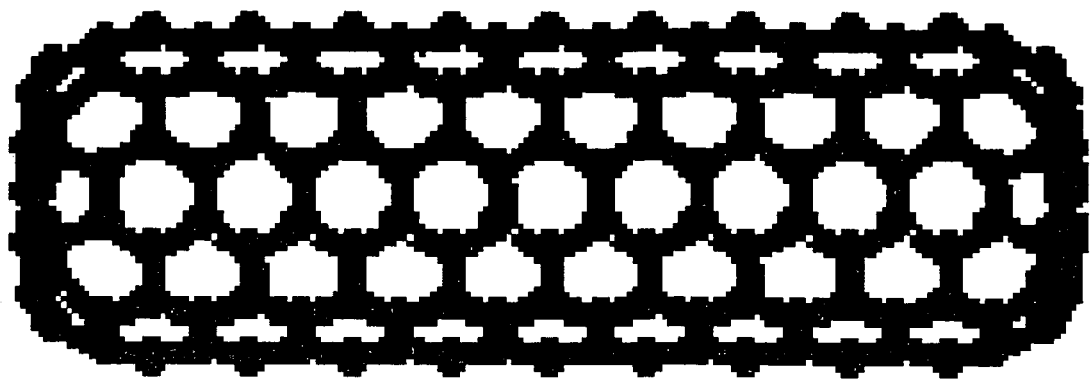
FIG. 11 is a model diagram depicting a CNT of which both ends are sealed.
Figure 12:
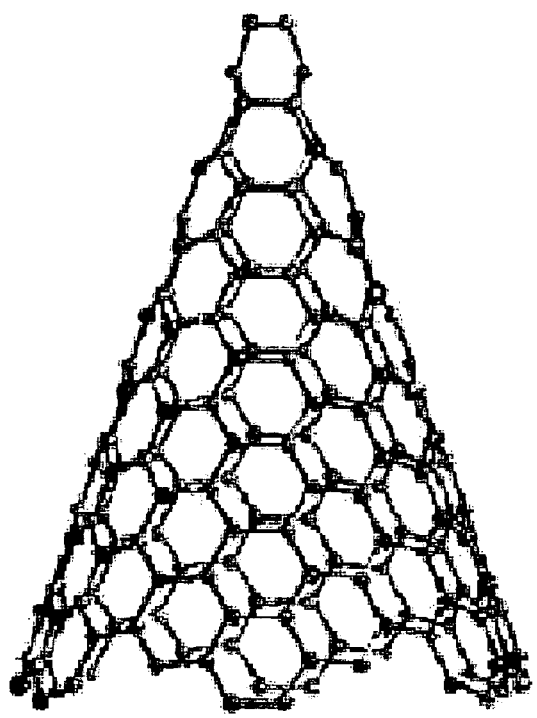
FIG. 12 is a model diagram depicting the structure of a nanocone.

Such a structure often has a six-membered-ring network structure, which is preferable, but may have a five-membered ring or other ring structures in some cases. FIG. 9 shows a fullerene, FIG. 10 shows a CNT of which the edges are not sealed, FIG. 11 shows a CNT of which both edges are sealed, and FIG. 12 shows a nanocone. Generally the diameter of a fullerene is about 1 nm, the size of a carbon nanotube and carbon nanohorn is 1 nm to 100 μm long in the major axis direction, and a 0.4 nm to 1 μm in diameter which corresponds to the length in the minor axis direction, the height of the cone of the carbon nanocone is in the range of the length corresponding to the length of the carbon nanotube in the major axis direction, and the diameter of the base is in the range of the length corresponding to the diameter of the carbon nanotube. If a CNT with a long major axis or another structure is used, second magnetic particles, of which the major axis is shorter than that, may be scattered in CNTs. In other words, a plurality of magnetic particles may exist in one cage. This makes the dispersion of second magnetic particles easier.

These structures are so called nano-sized structures. Accordingly, using such structures can easily disperse the small magnetic particles with a distance from one another and weaken the magnetic coupling between the second magnetic particles, and can also arrange the magnetic particles densely in the medium protective layer of the present invention, so the magnetic flux from the magnetic layer thereunder can be accurately reflected without deteriorating the resolution. It is also easier to implement uniform distribution of the second magnetic particles when viewed in a direction perpendicular to the magnetic layer.

Such structures are also preferable for the primary function as the medium protective layer. For example, the Young's modulus of a carbon nanotube is estimated as several thousand GPa, though it varies depending on the length of the carbon nanotube. Whereas the Young's modulus of DLC (α-C:H), which is generally used for the protective layer, is about 280 to 300 GPa. Such high elasticity works as a buffer to protect the transducer and the magnetic recording medium from the shock of collision, so the carbon nanotube has sufficient strength as a material for the protective layer. A carbon nanotube excels not only in mechanical strength but also in thermal conductivity and heat resistance. The six-membered-ring structure thereof is also advantageous for its high chemical resistance.

These structures need not be perfect, but may have part of the structure open. Structures overlapping in layers, such as a concentric spherical fullerene in which layers overlap like an onion, a multi-layer tube, or a multi-layer cone, may be used. In other words, it is sufficient if the structure can create a status where a second magnetic particle is enclosed completely or partially.

As a material which forms such a structure, carbon is well known, but other material may be used, or carbon may partially contain other materials within the scope of the essential character of the present invention. Known nano-sized structures comprising other materials are, for example, a nanotube of which the basic frame is comprised of noble metal elements (e.g. platinum, palladium, rhodium, ruthenium, iridium, gold and silver), an oxide nanotube comprised of vanadium oxide, silica and titania, and a boron nitride nanocone. In the case where other materials are contained, the material may be part of a chemical bonding of the above structure, or may coexist without chemical bonding.

For the purpose of dispersing small second magnetic particles with a distance from one another in the medium protective layer according to the present invention, a part or the whole of the above-described cage structure or a six-membered-ring network structure may be lost for some reason after the formation of the medium protective layer. Accordingly, in the present invention, the cage structure or the six-membered-ring network structure, referred to as "the medium protective layer containing second magnetic particles existing in cage structures" or "the cage structure having a six-membered-ring network structure of carbon" includes the case where the protective layer of the present invention once had a cage structure or six-membered-ring network structure, but that structure is now lost.

The medium protective layer according to the present invention may be a single layer comprised only of the cage structures and second magnetic particles, or a single layer comprised of the cage structures, second magnetic particles, and a conventional protective layer material, such as diamond-like carbon, but also may be a combination with other layers, such as a conventionally known medium protective layer, for example, a layer comprised of diamond-like carbon. The medium protective layer according to the present invention may have distribution of the content. For example, the content of the second magnetic particles in the area near the magnetic layer may be higher than the content of the second particles in an area far from the magnetic layer. On average, it is preferable that the second magnetic particles are contained in the medium protective layer at about 20 to 99% by weight, and 50 to 95% by weight is more preferable. The thickness of the medium protective layer formed in this way is preferable in a 0.3 to 500 nm range as a whole, in order to implement the object of the present invention at the maximum level. A 0.3 to 50 nm range is preferable, and a 1 to 20 nm range is more preferable.

As described above, the magnetic spacing can be substantially decreased while maintaining the flying height of the transducer and the structure of the medium protective layer, and the magnetic recording device which uses this magnetic recording medium as its recording medium can be made compact with a large recording density.

The above description concerns the case where the magnetic particles are contained in the medium protective layer, but if a head protective layer exists on the transducer, a similar effect can be expected by magnetic particles contained in the head protective layer. In this case, the above-described various aspects of the present invention can be applied as they are when the "magnetic protective layer" is taken as the "head protective layer", and the "second magnetic particles" are taken as existing in the head protective layer. Both the recording medium protective layer and the head protective layer may contain the magnetic particles.

A method for forming a protective layer for a magnetic recording device (hereafter simply called "protective layer") of the present invention includes a method of forming the cage structures containing the magnetic particles that have been prepared in advance, on the magnetic layer or on the transducer. The case of forming the cage structures on the magnetic layer will be described below. For the cage structure forming method and the method of introducing the magnetic particles into the cage structure, conventionally known methods can be used. For example, aligned CNTs enclosing Fe can be obtained by cracking C60 and ferrocene by thermal decomposition. Thermal decomposition is performed at 900 to 1050° C. while allowing Ar gas to flow. Or CNTs enclosing an FeNi alloy, such as Fe65Ni35, can be obtained by thermal decomposition of aerosol at 800° C. after dissolving nickelocene and ferrocene in benzene.

Fabricated cage structures are dispersed in a liquid base material, and are formed as a layer on the surface of the magnetic layer by coating, dipping or the like. Spin coating, for example, may be used. Cage structures are secured on the surface of the magnetic layer by a base material. For the base material, resin (plastic), for example, can be used. If an organic solvent is used as the base material and surface active molecules (e.g. oleic acid and oleyl amine) are formed on the surface of the cage structures, then the cage structures can be uniformly aligned by a physical or chemical binding force (e.g. Van der Waals force, magnetostatic coupling force, binding by a hydrophilic group or a hydrophobic group). Therefore, in this case, it is important to control the speed of solidifying the base material since time for uniformly aligning the cage structures must be provided. For example, by coating the cage materials in an atmosphere which is the same as the base material, volatility of the base material can be delayed. The base material may be solidified by heating.

There is also another method in which the cage structures are introduced at the same time when the base material is deposited on the surface of the magnetic layer (e.g. by spraying). In this case, the cage structures are introduced while depositing the protective layer by CVD, for example, and a structure, where the cage structures are buried in an amorphous carbon such as DLC, can be obtained. A method of burying the cage structures later into the base material may be used. And the surface of the protective layer may be polished and smoothed after depositing the film.

Cage structures containing magnetic particles according to the present invention may be directly formed on the magnetic layer. For example, after depositing the magnetic layer, cage structures containing the magnetic particles may be directly formed while the protective layer is deposited by CVD. Thermal CVD, thermal filament CVD, electron bombardment CVD and plasma CVD are examples of the CVD methods.

In particular, the case of plasma CVD using $CH_4$ gas (or $CH_4+H_2$) is being used for forming the protective layer in the current process. In the plasma CVD, only the cage structures can be formed, or the amorphous carbon layer and the cage structure layer can be alternately layered, or a layer comprising the amorphous carbon and cage structures can be formed, by changing the type of gas to be introduced, the catalyst, the temperature and the pressure. Plasma CVD includes microwave plasma CVD, ECR plasma CVD and RF plasma CVD, for example.

Other methods include arc discharging and laser ablation. Also a plasma synthesis method and a hydrocarbon catalytic decomposition method are possible. Using one of these methods or by combining the above methods, the protective layer according to the present invention can be formed. After film deposition, the surface of the protective layer may be polished and smoothed. By performing etching processing on the magnetic layer before depositing the film, the growth direction of CNT can be controlled not only in the perpendicular direction to the substrate but also in any other three-dimensional directions.

If the protective layer is formed using the above-described nanostructures, noise may increase if the protective layer becomes thick, so it is preferable that the film thickness is minimized. For this, it is preferable that for the alignment of CNTs, the major axis is in parallel with the surface of the magnetic layer, though an alignment with their major axis perpendicular to the surface of the magnetic layer is also possible. With this, film thickness can be decreased to about 0.4 nm, which is the minimum diameter of CNT. Furthermore, to improve the resolution, it is preferable that CNTs are aligned densely.

To control the distance between the magnetic particles, the properties of the above-described nanostructures may be used. For example, the minimum diameter of a CNT is about 0.4 nm, but may be increased to about 2 nm in the case of a single layer CNT, so the distance between CNTs, that is the distance between the magnetic particles, can be controlled by controlling the number of layers of CNTs. For example, increasing by one layer increases the diameter about 0.7 nm. The length of a CNT can also be controlled by the growth conditions. In this way, by controlling the size of a nanostructure, such as CNT, the distance between the magnetic particles can be controlled.

What is claimed is:

1. A magnetic recording medium comprising:
    a magnetic layer containing first magnetic particles formed on a substrate; and
    a magnetic recording medium protective layer containing second magnetic particles formed on said magnetic layer,
    wherein an average projection area X per second magnetic particle and an average projection area Y per first magnetic particle are $X \leq Y/10$ when viewed in a direction perpendicular to said magnetic layer surface.

2. The magnetic recording medium according to claim 1, wherein the length in a cylindrical axis direction when said second magnetic particle is regarded as a cylinder is in a 0.3 to 500 nm range.

3. The magnetic recording medium according to claim 1, wherein the circle-equivalent diameter of the end face when said second magnetic particle is regarded as a cylinder is in a 0.3 to 500 nm range.

4. The magnetic recording medium according to claim 1, wherein the diameter of said second magnetic particle when converted into a sphere is in a 0.3 to 500 nm range.

5. The magnetic recording medium according to claim 1, wherein the ratio of the mutually contacting magnetic particles to all magnetic particles is 50% or less in the case of said second magnetic particles.

6. The magnetic recording medium according to claim 1, wherein said magnetic recording medium protective layer contains second magnetic particles existing in cage structures.

7. The magnetic recording medium according to claim 6, wherein said cage structure has a six-membered-ring network structure of carbon.

8. The magnetic recording medium according to claim 6, wherein said cage structure is a structure selected from the group consisting of a spherical structure, a tube structure of which edges may not be sealed, and a conical structure.

9. The magnetic recording medium according to claim 1, wherein said second magnetic particles comprise iron, cobalt or nickel.

10. The magnetic recording medium according to claim 1, wherein said second magnetic particle has soft magnetism.

11. The magnetic recording medium according to claim 1, wherein the coercive force of said second magnetic particles is equal to or less than the coercive force of said first magnetic particles.

12. The magnetic recording medium according to claim 1, wherein the saturation magnetization of said second magnetic particles is equal to or more than the saturation magnetization of said first magnetic particles.

13. The magnetic recording medium according to claim 1, wherein said magnetic recording medium protective layer contains diamond-like carbon.

14. The magnetic recording medium according to claim 1, wherein said second magnetic particles are contained in said magnetic recording medium protective layer in the range of 20 to 99% by weight.

15. The magnetic recording medium according to claim 1, wherein the thickness of said magnetic recording medium protective layer is in a 0.3 to 500 nm range.

16. A magnetic recording device that uses the magnetic recording medium according to one of claims 1 and 2-15 as a recording medium.

* * * * *